(12) United States Patent
Huang

(10) Patent No.: US 6,266,345 B1
(45) Date of Patent: *Jul. 24, 2001

(54) METHOD AND APPARATUS FOR DYNAMIC ALLOCATION OF BANDWIDTH TO DATA WITH VARYING BIT RATES

(75) Inventor: Long-Gang Kevin Huang, Sunnyvale, CA (US)

(73) Assignees: Xuan Zhon Ni; Richard Szeto; Nikki Szeto; Kuang-Hua Ken Huang; Mei Ling Sun; Christopher Tan, all of San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,266

(22) Filed: Apr. 24, 1998

(51) Int. Cl.[7] .................................................. H04J 3/16
(52) U.S. Cl. ............................................ 370/468; 370/536
(58) Field of Search .................................. 370/466, 468, 370/470, 474, 476, 536, 542, 544

(56) References Cited

U.S. PATENT DOCUMENTS

| 5,065,396 | * | 11/1991 | Castellano et al. | 370/536 |
|---|---|---|---|---|
| 5,265,095 | * | 11/1993 | Fiedler et al. | 370/536 |
| 5,444,711 | * | 8/1995 | Mizuguchi et al. | 370/536 |
| 5,680,400 | * | 10/1997 | York | 370/536 |
| 5,825,766 | * | 10/1998 | Kobayashi et al. | 370/395 |
| 5,841,760 | * | 11/1998 | Martin et al. | 370/242 |
| 5,850,387 | * | 12/1998 | Lyon et al. | 370/250 |
| 5,878,039 | * | 3/1999 | Gorshe et al. | 370/376 |
| 5,923,671 | * | 7/1999 | Silverman | 370/542 |
| 5,970,067 | * | 10/1999 | Sathe et al. | 370/394 |
| 6,002,670 | * | 12/1999 | Rahman et al. | 370/238 |

* cited by examiner

Primary Examiner—Min Jung
(74) Attorney, Agent, or Firm—Blakely, Sokoloff, Taylor & Zafman LLP

(57) ABSTRACT

A method and apparatus for dynamic allocation of bandwidth to data with varying bit rates are disclosed in which a plurality of virtual channels to transmit a stream of data are allocated on a transmission medium supporting a transport standard capable of transmitting data at multiple different frequencies. The stream of data is transmitted on the allocated virtual channels. The stream of data is transmitted on the allocated virtual channels at a lowest frequency among the multiple different frequencies within the transport standard supported by the transmission medium.

21 Claims, 7 Drawing Sheets

METHOD AND APPARATUS FOR DYNAMIC ALLOCATION OF BANDWIDTH TO DATA WITH VARYING BIT RATES

FIELD OF THE INVENTION

The present invention relates to data transmission. More specifically, the present invention relates to a method and apparatus for dynamically allocating bandwidth to data with varying bit rates.

BACKGROUND OF THE INVENTION

Asynchronous Transfer Mode (ATM) is a high-speed connection-oriented multiplexing and switching method specified in international standards utilizing fixed-length cells to support multiple types of traffic. ATM has become a popular solution for digital broadcast signals transmitted over transmission mediums using the Synchronous Optical Network (SONET) and the Synchronous Digital Hierarchy (SDH) transport standard. The SONET transport standard has traditionally supported data transmission at frequencies of 1.5, 6, 45, and 140 megabits per second (MB/s). The SDH transport standard has traditionally supported data transmission at frequencies of 2, 8, 34, and 140 MB/s.

ATM allows data streams with varying bit rates to be effectively mapped onto transmission mediums using the SONET and SDH transport standards. ATM segments a data stream and writes the segmented data stream into payload sections of ATM cells that are transmitted on the transmission medium. ATM varies the density of the data written into each ATM cell which allows the data stream to be transmitted on the transmission medium at the appropriate rate.

One drawback of the ATM solution is that it may be expensive to implement. The ATM solution requires a complex network management system to support its switched network, multi-path environment. In addition, when transmitting large amounts of data, the data is required to be segmented into many small ATM cells no larger than 53 bytes which translates to additional overhead which is undesirable. Data transmission applications such as digital broadcasts are single-path, uni-direction applications that require large amounts of data to be transmitted. Digital broadcast applications that implement ATM do not utilize all the functionalities of ATM while incurring many of its drawbacks.

Thus, a more efficient method and apparatus for dynamically allocating bandwidth to data with varying bit rates is needed.

SUMMARY OF THE INVENTION

A method and apparatus for dynamic allocation of bandwidth to data with varying bit rates are disclosed in which a plurality of virtual channels to transmit a stream of data are allocated on a transmission medium supporting a transport standard capable of transmitting data at multiple different frequencies. The stream of data is transmitted on the allocated virtual channels. The stream of data is transmitted on the allocated virtual channels at a lowest frequency among the multiple different frequencies within the transport standard supported by the transmission medium.

BRIEF DESCRIPTION OF THE DRAWINGS

The present invention is illustrated by way of example and not by way of limitation in the figures of the accompanying drawings, in which the like references indicate similar elements in and in which:

FIG. 1 is a block diagram that illustrates a network environment in which an embodiment of the present invention is implemented on;

FIG. 2 is a block diagram that illustrates a system in which an embodiment of the present invention is implemented on;

DETAILED DESCRIPTION

A method and apparatus for dynamically allocating bandwidth to data with varying bandwidth is disclosed. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Figure 1:
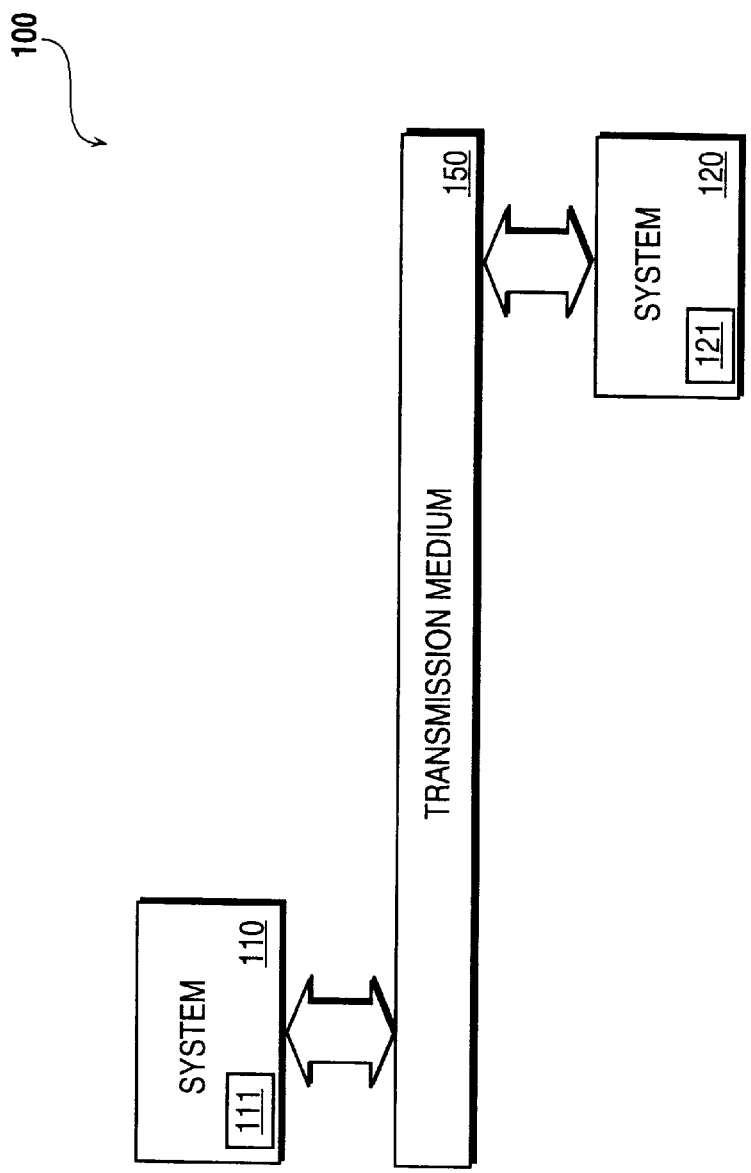

FIG. 1 is a block diagram illustrating a network 100 in which the present invention is implemented on. The network includes a first system 110 and a second system 120. The first system 110 and the second system 120 are coupled to a transmission medium 150. According to an embodiment of the present invention, the first system 110 operates to transmit data to the second system 120 via the transmission medium 150. The transmission medium 150 may be fiber optics, cable, twisted pair, microwave, or other transmission media. Data transmission on the transmission medium 150 may comply with a transport standard such as SONET, SDH, Fiber Distributed Data Interface (FDDI), or other transport standards. Although FIG. 1 illustrates the transmission medium 150 configured on a linear bus, it should be appreciated that the transmission medium 150 may be configured in a ring, star, or other structure.

The first system 110 includes a data mapping unit 111. The data mapping unit 111 operates to format and configure data streams with varying bit rates that are transmitted on the transmission medium 150. According to an embodiment of the present invention, the data mapping unit 111 maps data to be transmitted directly on a physical layer of the transmission medium 150. The data mapping unit 111 allocates a number of virtual channels in which to package the data. Virtual channels are communication channels that provide for the sequential unidirectional transport of data. Virtual channels typically contain an overhead section that includes control information that supports transport functions. Virtual channels also include a payload section that includes the data that is transported. Virtual channels are typically referred to as virtual tributaries in the SONET transports standard and as virtual containers in the SDH transport standard. The allocation of virtual channels involves determining a bit rate of the data and determining a number and identity of virtual channels to use to transmit the data. The virtual channels allocated are configured to transmit the data at a same frequency. Together, the virtual channels are concatenated such that the phase relationships of each virtual channel is fixed and the transmitted data appears to be transmitted as a whole unit. According to an embodiment of the present invention, the frequency selected to transmit the virtual channels is the lowest frequency defined by a transport standard of the transmission medium 150. The data mapping unit 111 also packages overhead information that identifies the virtual channels allocated for transmitting the data. The second system 120 includes a data demapping unit 121. The data demapping unit 121 operates to unpackage the data transmitted on the transmission medium 150 and assemble the data according to overhead information received from the first system 110.

It should be appreciated that the first system 110 and the second system 120 may include both a data mapping unit 111 and a data demapping unit 121 such that either system may transmit and receive data on the transmission medium 150. The data mapping unit 111 and the data demapping unit 121 may be implemented using any known circuitry or technique.

Figure 2:
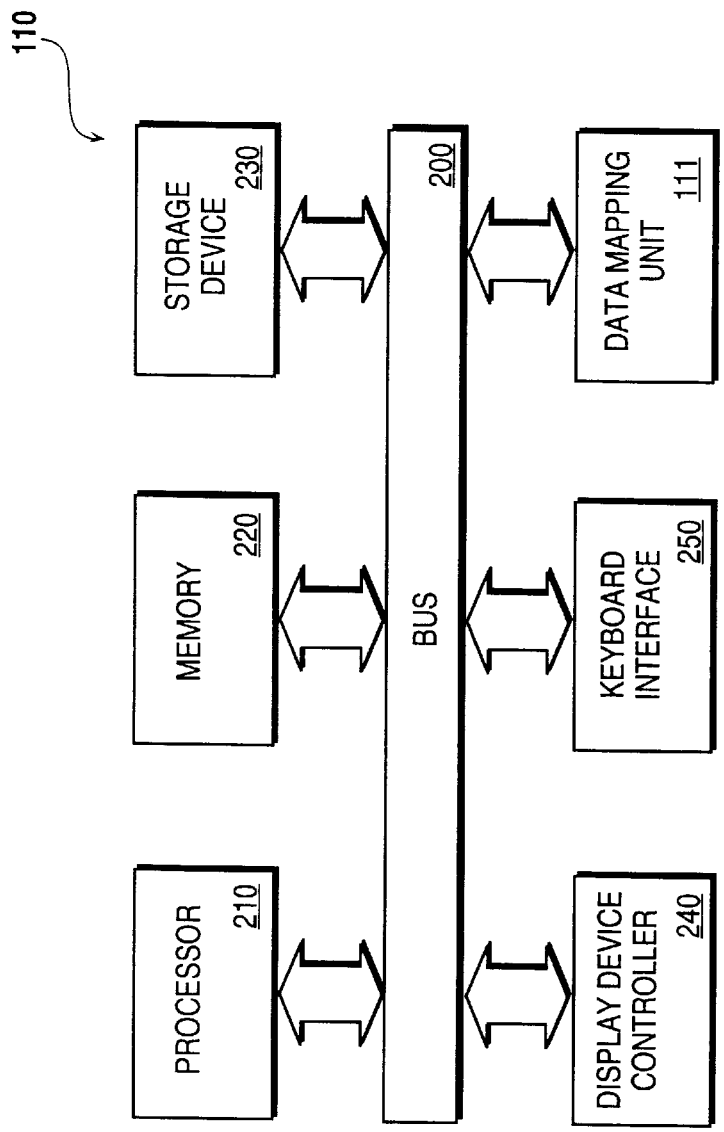

FIG. 2 illustrates a first system 110 according to an embodiment of the present invention. The computer system includes a bus 200. The bus 200 may be a single bus or a combination of multiple buses. As an example, the bus 200 may be a Peripheral Component Interconnect (PCI) bus, a Personal Computer Memory Card International Association (PCMCIA) bus, an Industry Standard Architecture (ISA) bus, a NuBus, or other buses. The bus 200 provides communication links between components in the computer system 110.

The computer system 110 includes a processor 210 coupled to the bus 200. The processor 210 operates to process data signals. The processor 210 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 110. However, it is understood that the present invention may be implemented in a computer system having multiple processors.

The computer system 110 includes a main memory 220. The memory 220 may be a dynamic random access memory (DRAM) device, a synchronous direct random access memory (SDRAM) device, or other memory device. The memory 220 may store instructions and code represented by data signals that may be executed by the processor 101. A data storage device 230 is coupled to the bus 200. The data storage device 230 may be a hard disk drive, a floppy disk drive, a CD-ROM device, a flash memory device or other mass storage device.

A display device controller 240 is coupled to the bus 200. The display device controller 240 allows coupling of a display device (not shown) to the computer system 110 and acts as an interface between the display device and the computer system 110. The display device controller 240 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 110 through the display device controller 240 and displays the information and data signals to the user of the computer system 110.

A keyboard interface 250 is coupled to bus 200. The keyboard interface 250 may be a keyboard controller or other keyboard interface. The keyboard interface 250 allows coupling of a keyboard (not shown) to the computer system 110 and transmits data signals from a keyboard to the computer system 110.

According to an embodiment of the present invention, the data mapping unit 111 is implemented as hardware and is coupled to the bus 200. In an alternate embodiment of the present invention, the mapping unit is implemented by software and resides in main memory 220 as sequence of instructions. In the software embodiment of the present invention, dynamic allocation of bandwidth to data with varying bit rates is performed by the computer system 110 in response to the processor 210 executing sequences of instructions in main memory 220. Such instructions may be read into memory 220 from another computer-readable medium, such as data storage device 230, or from another source. Execution of the sequences of instructions causes the processor 210 to dynamically allocate bandwidth to data with varying bit rates, as will be described hereafter. It should be appreciated that the present invention may also be implemented using a combination of hardware and software and is not limited to any specific combination of hardware circuitry and software. It should also be appreciated that the present invention may be implemented in a system other than a computer system having the components described in FIG. 2.

Figure 3:
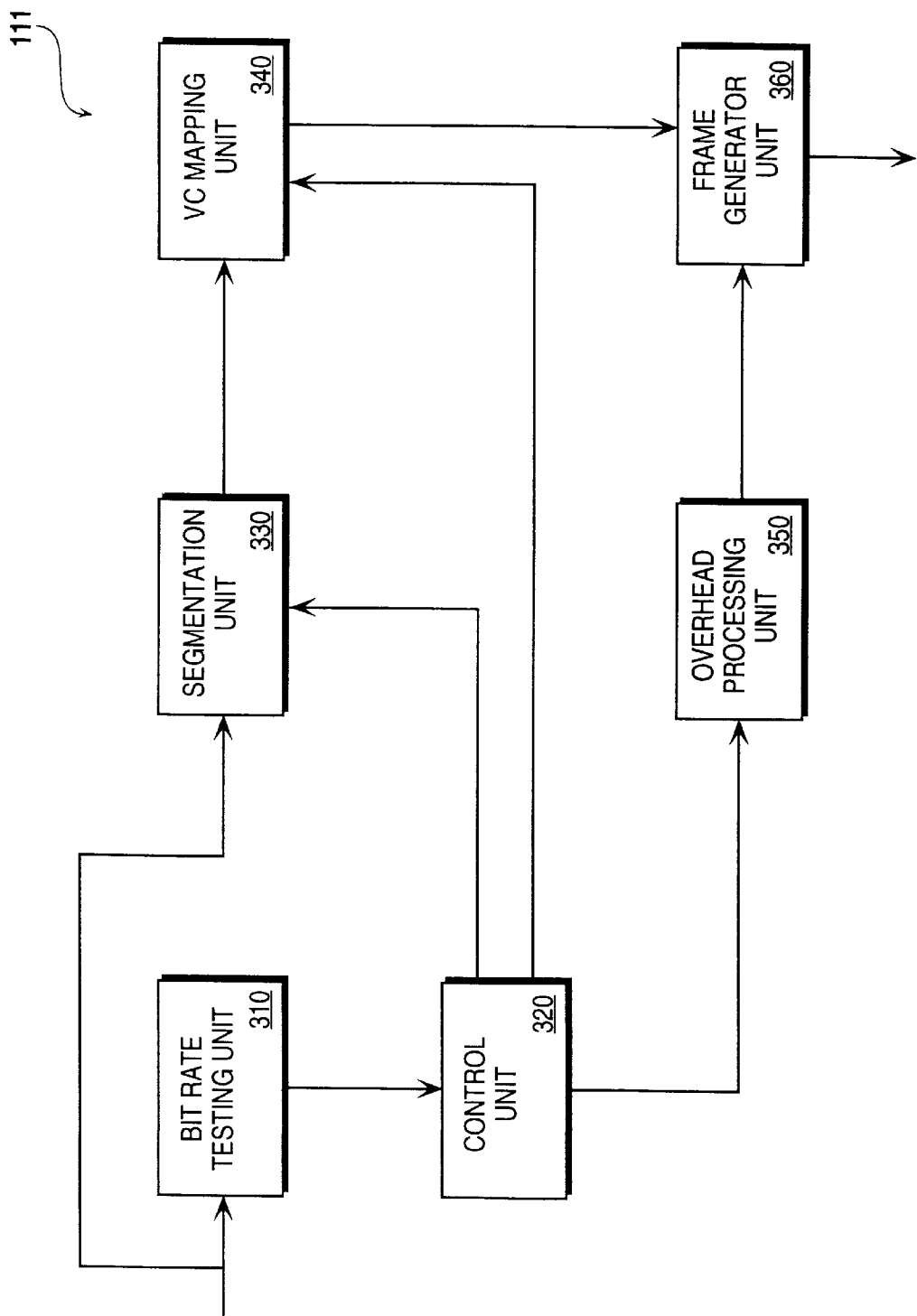
FIG. 3 is a block diagram of a data mapping unit according to an embodiment of the present invention.

FIG. 3 illustrates a data mapping unit 111 according to an embodiment of the present invention. The data mapping unit 111 includes a bit rate testing unit 310. The bit rate testing unit 310 receives a stream of data to be transmitted remotely over the transmission medium 150 (shown in FIG. 1). The bit rate testing unit 310 operates to determine the bit rate which the stream of data is to be transmitted. According to an embodiment of the present invention, the bit rate testing unit 310 determines the bit rate from bit rate information in the stream of data. According to an alternate embodiment of the present invention, the bit rate testing unit 310 determines the bit rate from analyzing the rate that the stream of data was sent to the bit rate testing unit 310 and uses the rate as the bit rate.

A control unit 320 is coupled to the bit rate testing unit. The control unit 320 receives the bit rate from the bit rate testing unit 310 and determines a number virtual channels to allocate to transmit the data stream. The control unit 320 determines the number of virtual channels to allocate by dividing the bit rate by a frequency that is selected for the virtual channels to transmit data. The selected frequency may be any frequency defined by the transport standard of the transmission medium. For example, the SONET transport standard defines frequencies of 1.5, 6, 45, and 140 Mb/s and the SDH transport standard defines frequencies of 2, 8, 34, and 140 Mb/s. According to a preferred embodiment of the present invention, the frequency selected for the virtual channels to transmit data is the lowest frequency defined by the transport standard.

For example, if a data stream has a bit rate of 4 Mb/s, the control unit 320 would allocate three 1.5 Mb/s virtual tributaries defined by the SONET transport standard or two 2 Mb/s virtual containers defined by the SDH transport standard. The three 1.5 Mb/s virtual tributaries defined by the SONET transport standard would have 0.5 Mb/s of unused bandwidth. The two 2 Mb/s virtual containers defined by the SDH transport standard would not have any unused bandwidth. If a data stream has a bit rate of 7 Mb/s, the control unit 320 would allocate five 1.5 Mb/s virtual tributaries defined by the SONET transport standard and four 2 Mb/s virtual containers defined by the SDH transport standard. The five 1.5 Mb/s virtual tributaries defined by the SONET transport standard would have 0.5 Mb/s of unused bandwidth. The four 2 Mb/s virtual containers defined by the SDH transport standard would have 1 Mb/s of unused bandwidth. By selecting a lowest frequency defined by the transport standard to transport the data stream, the mapping unit 111 is able to more efficiently utilize the transmission medium 150 by minimizing the amount of unused bandwidth in each concatenated group of virtual channels. The control unit 320 also selects the virtual channels that are used for transmitting the data stream.

A segmentation unit 330 is coupled to the control unit 320. The segmentation unit 330 receives the number of virtual channel allocated to transmit the data stream from the control unit 320. The segmentation unit 330 operates to segment portions of the data stream equally into a number of groups equaled to the number of virtual channels allocated to transmit the data stream. According to an embodiment of the present invention, the portions may be bytes of data in the stream of data, bits of data in the stream of data, or other units of data in the stream of data A virtual channel (VC) mapping unit 340 is coupled to the control unit 320 and the segmentation unit 330. The virtual channel mapping unit 340 receives the identity of the virtual channels selected for transmitting the data stream from the control unit 320 and the segmented portions of the data stream from the segmentation unit 330. The virtual channel mapping unit 340 operates to package the segmented portions of the data stream into payload sections of the virtual channels. During occasions when virtual channels have unused bandwidth for transmitting data, the virtual channel mapping unit 340 may utilize the unused bandwidth for transmitting data from another data stream or the virtual channel mapping unit 340 may package stuffed bits into the virtual channel.

An overhead processing unit 350 is coupled to the control unit 320. The overhead processing unit 350 receives the number of channels allocated for transmitting the data stream from the control unit 320. The overhead processing unit 350 operates to generate path overhead (POH) information for each virtual channel as required by the transport standard of the transmission medium 150 for payload transport functions. The path overhead information may include information regarding whether the data in the virtual channel is forward error checking (FEC) coded. FEC information operates to insure that the virtual channel transmitted was transmitted without alternation and allows the original data to be recovered if alternation has occurred. The path overhead may also include size of payload (SPV) information that operates to identity the size of the data that is transmitted in payload section of the virtual channel. The path overhead may also include virtual channel identifier (VCI) or virtual path identifier (VPI) information that operates to identify the destination of the virtual channel. Other overhead information that supports transport functions on the transmission medium 150 may also be generated by the overhead processing unit 350.

In addition to the standard path overhead required by the transport standard transmission medium 150, the overhead processing unit 350 also writes virtual channel data (VCD) that indicates a number of virtual channels allocated or concatenated with a specific virtual channel and virtual channel identifiers that identify the virtual channels that are selected to be concatenated to transmit the data.

A frame generator unit 360 is coupled to the virtual channel mapping unit 340 and the overhead processing unit 350. The frame generator unit 360 receives the payload packaged virtual channels from the virtual channel mapping unit 360 and the overhead information from the overhead processing unit 350. The frame generator unit 360 operates to package the overhead information into overhead sections of the virtual channels and transmit the virtual channels onto the transmission medium 150 simultaneously as a single frame.

The bit rate testing unit 310, control unit 320, segmentation unit 330, virtual channel mapping unit 340, overhead processing unit 350, and the frame generator unit 360 may be implemented by any known circuitry or technique. According to one hardware embodiment of the present invention, the bit rate testing unit 310, control unit 320, segmentation unit 330, virtual channel mapping unit 340, overhead processing unit 350, and the frame generator unit 360 all reside on a same semiconductor substrate.

Figure 4:
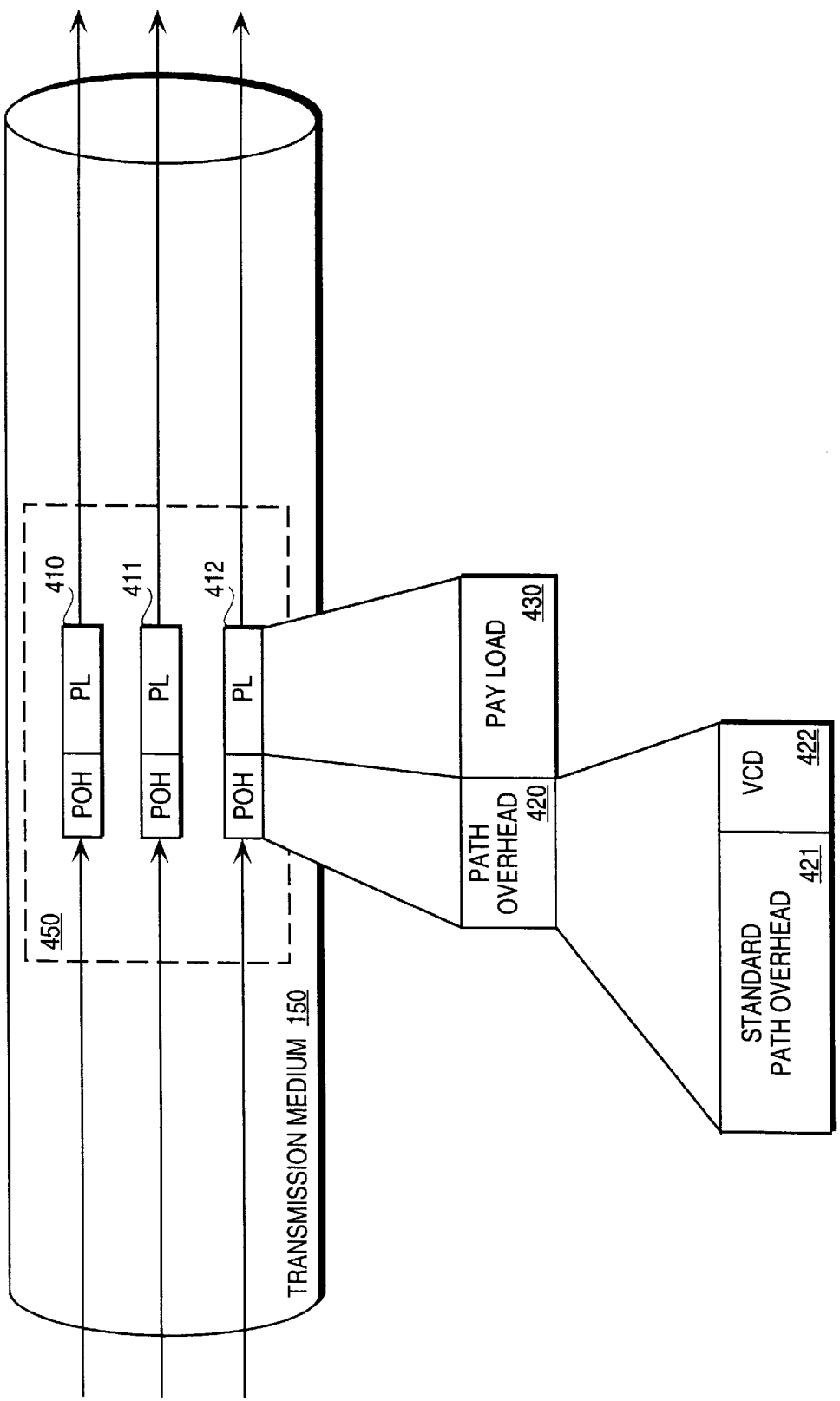
FIG. 4 illustrates a frame of data transmitted on a transmission medium according to an embodiment of the present invention.

FIG. 4 illustrates a frame of data 450 transmitted on the transmission medium 150. The frame of data 450 shown in FIG. 4 is shown to includes a first virtual channel 410, a second virtual channel 411, and a third virtual channel 412. It should be appreciated that the number of virtual channels used in a frame for transmitting data may vary depending on the bit rate of the stream of data and the frequencies defined by the transport standard of the transmission medium.

Each virtual channel includes a path overhead section and a payload section. The path overhead section of virtual channel 412 is shown as block 420 and the payload section of virtual channel 412 is shown as block 430. The path overhead section 420 includes standard overhead information 421 that is required by the transport standard of the transmission medium 150. The path overhead section 420 also includes additional virtual channel data (VCD) 422 that indicates the number and identity of the virtual channels concatenated with the third virtual channel 412. In this example, the virtual channel data indicates that three virtual channels are concatenated together to transmit the stream of data and the identities of the virtual channels.

Network management (not shown) in the first system 110 (shown in FIG. 1) and the second system 120 (shown in FIG. 2) support the concatenation of the virtual channels 410–412. The network management assigns a pointer for each virtual channel 410–412 that points to a value. The values indicate an order in which the segmented data stored in the payload of each of the virtual channel 410–412 should be reassembled.

The number of virtual channels that may be transmitted on a transmission medium 150 at one time depends on the bandwidth of the transmission medium 150 and the frequencies recognized by the transport standard of the transmission medium 150. For example, if the transport medium 150 is a STM-1x or OC3x type media it has a bandwidth of 155 Mb/s. For a 155 Mb/s trunk line, eighty-four 1.5 Mb/s virtual tributaries may be implemented using the SONET transport standard and sixty-three 2.0 Mb/s virtual containers may be implemented using the SDH transport standard.

Figure 5:
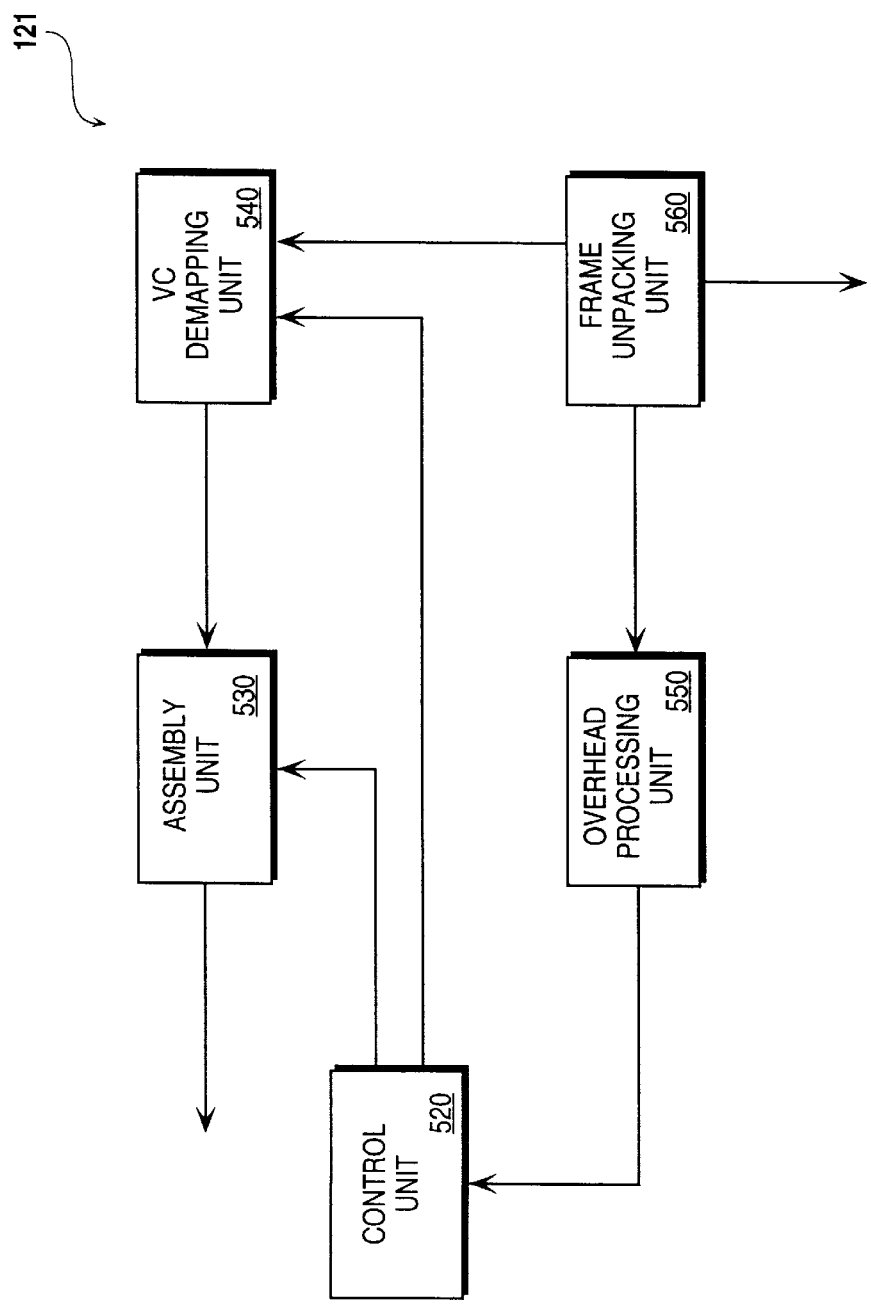
FIG. 5 is a block diagram of a data demapping unit according to an embodiment of the present invention.

FIG. 5 is a block diagram of a data demapping unit 121 according to an embodiment of the present invention. Similarly to the data mapping unit 111 (shown in FIG. 3), the data demapping unit 121 may be implemented as hardware and coupled to a bus similar to the bus 200 shown in FIG. 2 in a computer system similar to the computer system 110 shown in FIG. 2 without the mapping unit 111. The data mapping unit 121 may also be implemented as software and reside in main memory as a sequence of instructions. Alternatively, the data mapping unit 111 and the data demapping unit 121 may be implemented together as hardware, software, or a combination of hardware and software.

The demapping unit 121 includes a frame unpacking unit 560. The frame unpacking unit 560 receives frames from the transmission medium 150 (shown in FIG. 4). The frame unpacking unit 560 operates to unpack the virtual channels in the frames received from the transmission medium 150.

An overhead processing unit 550 is coupled to the frame unpacking unit 560. The overhead processing unit 550 receives the virtual channels from the frame unpacking unit 560 and retrieves the path overhead information from the path overhead sections of the virtual channels.

A control unit 520 is coupled to the overhead processing unit 550. The control unit 520 receives the overhead processing information corresponding to each of the virtual channels. The control unit 520 determines the identity of the virtual channels that have been selected to transmit a specific stream of data from the overhead information. The control unit 520 also determines an order in which the segmented data in the payload sections of the selected virtual channels should be reassembled.

A virtual channel demapping unit 540 is coupled to the frame unpacking unit 560 and the control unit 520. The virtual channel demapping unit 540 receives the unpacked virtual channels from the frame unpacking unit 560 and the identities of the virtual channels that have been selected to transmit a specific stream of data. The virtual channel demapping unit 540 operates to retrieve the payload sections of the selected virtual channels.

An assembly unit 530 is coupled to the virtual channel demapping unit 540 and the control unit 520. The assembly unit 530 receives the payload sections of the selected virtual channels from the virtual channel demapping unit 540 and the order in which segmented data in the payload sections of the virtual channels should be reassembled. The assembly unit 530 operates to assemble the segmented data from the payload sections of the selected virtual channels in its original order.

The control unit 520, assembly unit 530, virtual channel demapping unit 540, overhead processing unit 550, and frame unpacking unit 560 may be implemented by any known circuitry or technique. According to one hardware embodiment of the present invention, the control unit 520, assembly unit 530, virtual channel demapping unit 540, overhead processing unit 550, and frame unpacking unit 560 all reside on a same semiconductor substrate.

Figure 6:
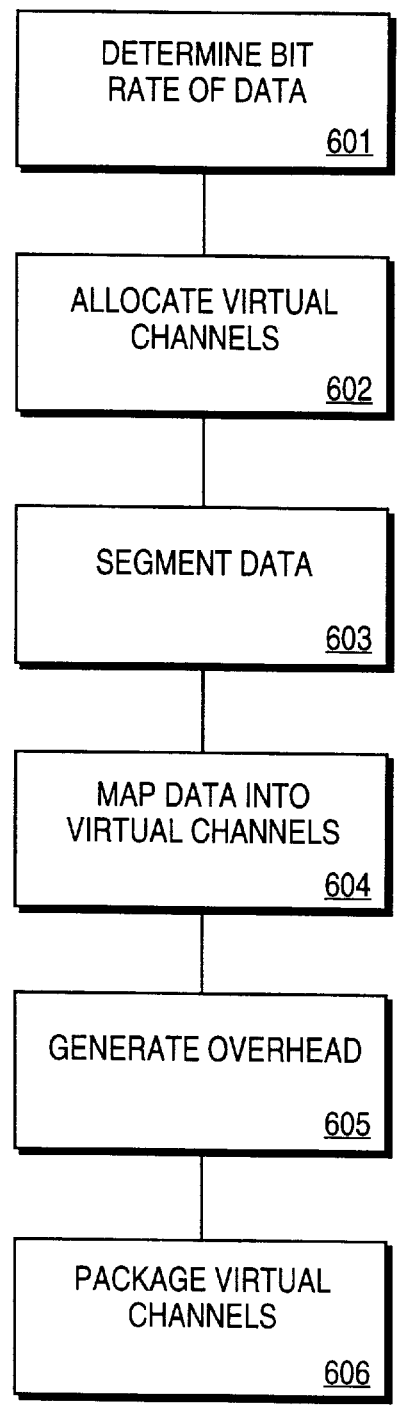
FIG. 6 is a flow chart that illustrates a method for dynamically allocating bandwidth to data with varying bit rates.

FIG. 6 is a flow chart that illustrates a method for dynamically allocating bandwidth to data with varying bandwidth. At step 601, a bit rate that the data is to be transmitted at is determined. According to an embodiment of the present invention, the bit rate is determined from bit rate information in the data. According to an alternate embodiment of the present invention, the bit rate is determined by analyzing the rate at which the bit rate was transmitted to a bit rate testing unit.

At step 602, virtual channels are allocated for transmitting the data. Allocating virtual channels is achieved by determining a number of virtual channels to allocate to transmit the data According to an embodiment of the present invention determining a number of virtual channels is achieved by dividing the bit rate by a frequency that the virtual channel is transmitting data. According to a preferred embodiment of the present invention, the frequency that the virtual channel is transmitting data is selected to be the lowest frequency defined by the transport standard of the transmission medium.

At step 603, the portions of the data is segmented equally into the number of virtual channels allocated to transmit the data. The portions may be in units of bytes, bits, or other units.

At step 604, the segmented portions of data are mapped into the allocated virtual channels.

At step 605, overhead information is generated for each allocated virtual channel. The overhead information includes standard path overhead information that supports payload transport functions and virtual channel data that indicates a number and identity of the virtual channels that have been allocated to transmit the data.

At step 606, the overhead information for each virtual channel is packaged with the payload information in each virtual channel and the allocated virtual channels are transmitted simultaneously on a transmission medium as a single frame.

Figure 7:
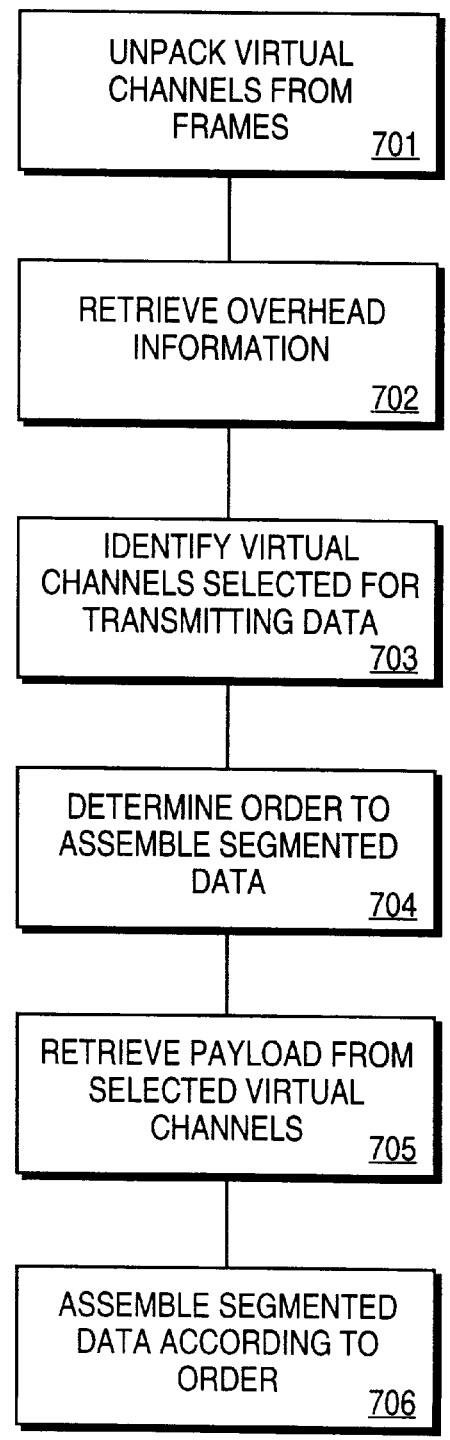
FIG. 7 is a flow chart that illustrates a method for processing transmitted data according to an embodiment of the present invention.

FIG. 7 is a flow chart that illustrates a method for processing transmitted data according to an embodiment of the present invention. At step 701, virtual channels are unpacked from frames of data received from a transmission medium.

At step 702, overhead information is retrieved from path overhead sections in the virtual channels.

At step 703, virtual channels that were selected to transmit a stream of data are identified from the overhead information.

At step 704, an order in which to assemble data stored in payload information from the virtual channels selected to transmit the stream of data is determined from the overhead information.

At step 705, the payload sections from the selected virtual channels are retrieved.

At step 706, segmented data in the payload sections of the selected virtual channels are assembled according to the order.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A communication method comprising:

allocating a plurality of virtual channels to transmit a stream of data on a transmission medium supporting a transport standard capable of transmitting data at multiple different frequencies; and transmitting the stream of data on the allocated virtual channels, the stream of data being transmitted on the allocated virtual channels at a lowest frequency among the multiple different frequencies within the transport standard supported by the transmission medium.

2. The method of claim 1, wherein the allocating of the plurality of virtual channels includes:

determining a bit rate for the stream of data; and determining a number of virtual channels to allocate based on the determined bit rate.

3. The method of claim 1, further comprising:

segmenting the stream of data; and mapping the stream of data onto the allocated virtual channels.

4. The method of claim 1, further comprising:

generating path overhead information for the stream of data; and reassembling the transmitted stream of data using the path overhead information.

5. The method of claim 1, wherein the transport standard includes a Synchronous Optical Network (SONET) transport standard, Synchronous Digitial Hierarchy (SDH) transport standard, or Fiber Distributed Data Interface (FDDI) transport standard.

6. An apparatus comprising:

a control unit to allocate a plurality of virtual channels to transmit a stream of data on a transmission medium supporting a transport standard capable of transmitting data at multiple different frequencies and to transmit the stream of data on the allocated virtual channels, the stream of data being transmitted on the allocated virtual channels at a lowest frequency among the multiple different frequencies within the transport standard supported by the transmission medium.

7. The apparatus of claim 6, further comprising:

a segmentation unit coupled to the control unit and to determine a bit rate for the stream of data, to determine a number of virtual channels to allocate based on the determined bit rate, and to segment the data by a number of the virtual channels.

8. The apparatus of claim 7, further comprising:

a mapping unit coupled to the segmentation unit and to map the segmented data into payload sections in the virtual channels.

9. The apparatus of claim 7, further comprising:

an overhead processing unit coupled to the control unit and to generate overhead information that is used for payload transport functions.

10. The apparatus of claim 7, further comprising:

a frame generator unit coupled to the mapping unit and to package overhead information with the payload sections in the virtual channels and to transmit the virtual channels simultaneously on a transmission medium as a single frame.

11. The apparatus of claim 6, the transport standard includes a Synchronous Optical Network (SONET) transport standard, Synchronous Digitial Hierarchy (SDH) transport standard, or Fiber Distributed Data Interface (FDDI) transport standard.

12. A machine-readable providing instructions, which if executed by a processor, cause the processor to perform an operation comprising:

allocating a plurality of virtual channels to transmit a stream of data on a transmission medium supporting a transport standard capable of transmitting data at multiple different frequencies; and transmitting the stream of data on the allocated virtual channels, the stream of data being transmitted on the allocated virtual channels at a lowest frequency among the multiple different frequencies within the transport standard supported by the transmission medium.

13. The machine-readable medium of claim 12, further providing instructions, which if executed by the processor, cause the processor to perform an operation comprising:

determining a bit rate for the stream of data; and determining a number of virtual channels to allocate based on the determined bit rate.

14. The machine-readable medium of claim 12, further providing instructions, which if executed by the processor, cause the processor to perform an operation comprising:

segmenting the stream of data; and mapping the stream of data onto the allocated virtual channels.

15. The machine-readable medium of claim 12, further providing instructions, which if executed by the processor, cause the processor to perform an operation comprising:

generating path overhead information for the stream of data; and reassembling the transmitted stream of data using the path overhead information.

16. The machine-readable medium of claim 12, further providing instructions, which if executed by the processor, cause the processor to perform an operation comprising:

transmitting the stream of data on a Synchronous Optical Network (SONET) transport standard, Synchronous Digitial Hierarchy (SDH) transport standard, or Fiber Distributed Data Interface (FDDI) transport standard.

17. A communication system comprising:

means for allocating a plurality of virtual channels to transmit a stream of data on a transmission medium supporting a transport standard capable of transmitting data at multiple different frequencies; and means for transmitting the stream of data on the allocated virtual channels, the stream of data being transmitted on the allocated virtual channels at a lowest frequency among the multiple different frequencies within the transport standard supported by the transmission medium.

18. The communication system of claim 17, further comprising:

means for determining a bit rate for the stream of data; and means for determining a number of virtual channels to allocate based on the determined bit rate.

19. The communication system of claim 17, further comprising:

means for segmenting the stream of data; and means for mapping the stream of data onto the allocated virtual channels.

20. The communication system of claim 17, further comprising:

means for generating path overhead information for the stream of data; and means for reassembling the transmitted stream of data using the path overhead information.

21. The communication system of claim 17, wherein the means for transmitting includes means for transmitting the stream of data on a Synchronous Optical Network (SONEI) transport standard, Synchronous Digitial Hierarchy (SDH) transport standard, or Fiber Distributed Data Interface (FDDI) transport standard.

* * * * *